(12) United States Patent
Taki

(10) Patent No.: US 11,543,635 B2
(45) Date of Patent: Jan. 3, 2023

(54) ATTACHMENT OPTICAL SYSTEM, OPTICAL SYSTEM, MANUFACTURING METHOD OF OPTICAL SYSTEM

(71) Applicant: CANON KABUSHIKI KAISHA, Tokyo (JP)

(72) Inventor: Yoshiyuki Taki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 17/182,382

(22) Filed: Feb. 23, 2021

(65) Prior Publication Data

US 2021/0278641 A1 Sep. 9, 2021

(30) Foreign Application Priority Data

Mar. 3, 2020 (JP) .............................. JP2020-035790

(51) Int. Cl.
*G02B 15/02* (2006.01)
*G02B 15/08* (2006.01)
*G02B 15/14* (2006.01)
*G02B 3/06* (2006.01)

(52) U.S. Cl.
CPC .............. *G02B 15/08* (2013.01); *G02B 3/06* (2013.01); *G02B 15/14* (2013.01)

(58) Field of Classification Search
CPC ........ G02B 15/02; G02B 15/04; G02B 15/06; G02B 15/08; G02B 15/10; G02B 15/12; G02B 15/167
See application file for complete search history.

(56) References Cited

U.S. PATENT DOCUMENTS 9,645,522 B2 5/2017 Taki
2018/0217367 A1* 8/2018 Byler ..................... G02B 23/12

FOREIGN PATENT DOCUMENTS

JP 2004-325711 A 11/2004
JP 2017-026773 A 2/2017

* cited by examiner

*Primary Examiner* — Joseph P Martinez
(74) *Attorney, Agent, or Firm* — Carter, DeLuca & Farrell LLP

(57) ABSTRACT

An attachment optical system includes a first converter optical system attachable to an object side of an imaging optical system, and a second converter optical system attachable to an image side of the imaging optical system. The first converter optical system includes a dome-shaped cover and at least one positive lens. A predetermined condition is satisfied.

11 Claims, 10 Drawing Sheets

ATTACHMENT OPTICAL SYSTEM, OPTICAL SYSTEM, MANUFACTURING METHOD OF OPTICAL SYSTEM

BACKGROUND OF THE INVENTION

Field of the Invention

The present invention relates to an attachment optical system, which is suitable for a digital video camera, a digital still camera, a broadcasting camera, a film-based camera, a surveillance camera and the like.

Description of the Related Art

Attachment optical systems attachable to an imaging lens have conventionally been known. The number of users who enjoy underwater imaging has recently increased, and an imaging lens optimally designed for underwater use is increasingly demanded. An underwater camera and an amphibious camera generally use a camera that is housed in an underwater housing or a camera that itself has a waterproof mechanism. However, each of water and salt water has a refractive index and dispersion different from those of air: For example, the refractive index for the d-line is about 4/3 times as large as that of air, and the dispersion in Abbe number is different by about 62. Therefore, when an imaging optical system in which aberrations are sufficiently corrected in the air is used underwater, the refraction action at the interface between water and the imaging optical system changes and the optical performance deteriorates due to aberrational changes.

Japanese Patent Laid-Open No. ("JP") 2017-26773 discloses an attachment optical system attachable to an object side of an imaging lens and configured to satisfactorily correct various aberrations in the water. JP 2004-325711 discloses an attachment optical system attachable to an object side of an imaging lens in a dome-shaped housing and configured to satisfactorily correct various aberrations in the water.

When an optical system in which aberrations have been corrected on the assumption of use in the air is used in the water, the aberrations change as described above. More specifically, the aberrations fluctuate due to a curvature of field generated on the overexposure side, a distortion, and driving a focus lens unit so as to return a focus position that has shifted to the back of the image plane. The aberrations change more significantly as the housing mounted on the front of the optical system becomes thicker during underwater use. The attachment optical systems disclosed in JPs 2017-26773 and 2004-325711 have difficulty in handling all of these aberrational changes, and cannot provide an optical performance for underwater use which is almost as good as that for atmospheric use.

SUMMARY OF THE INVENTION

The present invention provides an attachment optical system, an optical system, and a method for manufacturing the optical system, each of which can provide an optical performance for underwater use which is almost as good as that for atmospheric use with a simple configuration.

An attachment optical system according to one aspect of the present invention includes a first converter optical system attachable to an object side of an imaging optical system, and a second converter optical system attachable to an image side of the imaging optical system. The first converter optical system includes a dome-shaped cover and at least one positive lens. The following conditional expression is satisfied:

$$0.00 < |fd/ffc| < 0.50$$

where fd is a focal length of the dome-shaped cover in water, and ffc is a focal length of the at least one positive lens.

An optical system according to another aspect of the present invention includes an imaging optical system, and an attachment optical system. The attachment optical system includes a first converter optical system attachable to an object side of an imaging optical system, and a second converter optical system attachable to an image side of the imaging optical system. The first converter optical system includes a dome-shaped cover and at least one positive lens. The following conditional expression is satisfied:

$$0.00 < |fd/ffc| < 0.50$$

where fd is a focal length of the dome-shaped cover in water, and ffc is a focal length of the at least one positive lens.

A manufacturing method of an optical system according to another aspect of the present invention includes the steps of attaching at least one positive lens in a first converter optical system to an object side of an imaging optical system, attaching a second converter optical system to an image side of the imaging optical system, and attaching a dome-shaped cover in the first converter optical system to the object side of the imaging optical system. The following conditional expression is satisfied:

$$0.0 < |fd/ffc| < 0.5$$

where fd is a focal length of the dome-shaped cover in water, and ffc is a focal length of the at least one positive lens.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Prior to a description of each example, the operations and effects of the present invention will be described. When an imaging optical system designed for use in the air is placed in a waterproof dome-shaped housing (dome-shaped cover) and used in the water, the medium outside the optical system changes from air to water, the refractive index changes, and thereby various performances change. More specifically, the following three changes mainly occur: First, the focus position shifts from the image plane in the air by the thickness of the dome-shaped housing. Second, the dome-shaped housing has a negative refractive power, and causes a curvature of field from the on-axis position to the off-axis position. Third, the dome-shaped housing has a negative refractive power, and causes a negative distortion. In attempting to solve these three problems, a new problem may arise depending on the solution means.

First, the focus can be returned to the image plane position by moving the focus lens in the imaging optical system. However, this reduces a focusing amount, and it becomes impossible to secure a short distance range that can be imaged in the air. In addition, the aberration fluctuates due to the movement of the focus unit.

By attaching a converter optical system (attachment optical system) between the dome-shaped housing and the imaging optical system, the focus position can be returned to the image plane position without moving the focus unit in the imaging optical system. However, depending on a focusing amount, the positive refractive power of the converter optical system required for the correction increases, and the positive distortion significantly occurs.

In addition, by attaching a converter optical system between the imaging optical system and the image plane, the curvature of field can be corrected down to a level as much as that in the air. However, in order to correct the negative distortion caused by the dome-shaped housing, a strong negative refractive power is required around the converter optical system. By strengthening the refractive power of the converter optical system, the focusing amount when the focus lens in the imaging optical system is moved is significantly different from that in the air, and affects the AF (autofocus) performance.

From the above, the converter optical system is demanded to correct aberrational changes that occur in the water in a well-balanced manner, to limit the movement of the focus lens in the imaging optical system, and to stop increasing the refractive power of the so-called rear converter lens located on the image plane side of the imaging optical system. Each example of the present invention can solve the above problems and make the optical performance in the water almost as good as that in the air.

Figure 1A:
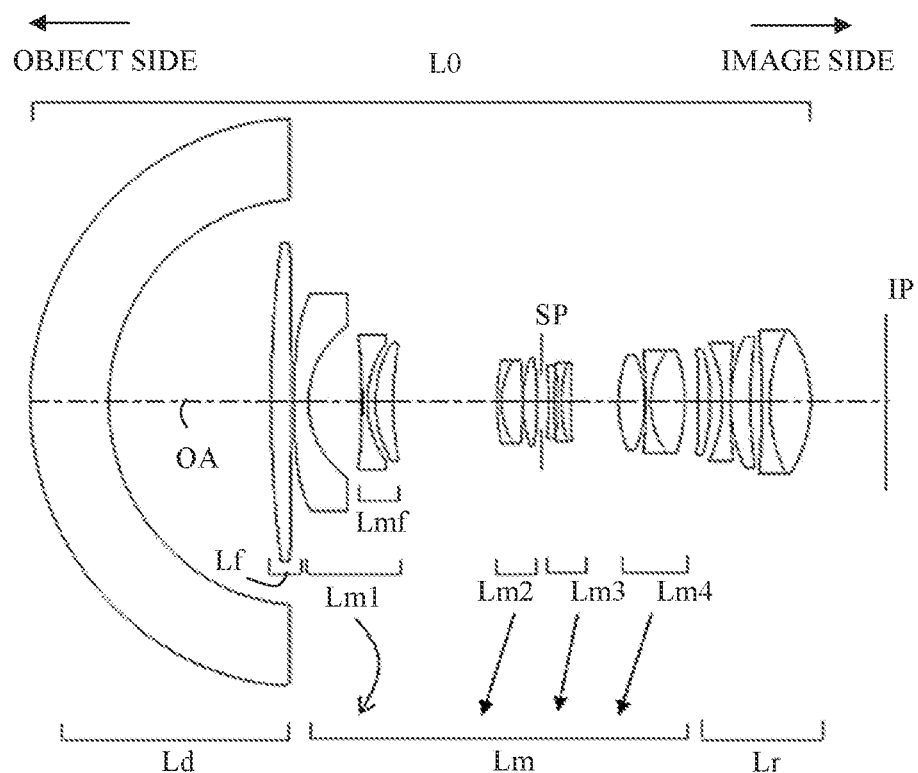
FIGS. 1A to 1C are sectional views of an imaging optical system according to Example 1 at a wide-angle end, an intermediate focal length, and a telephoto end.
Figure 1B:
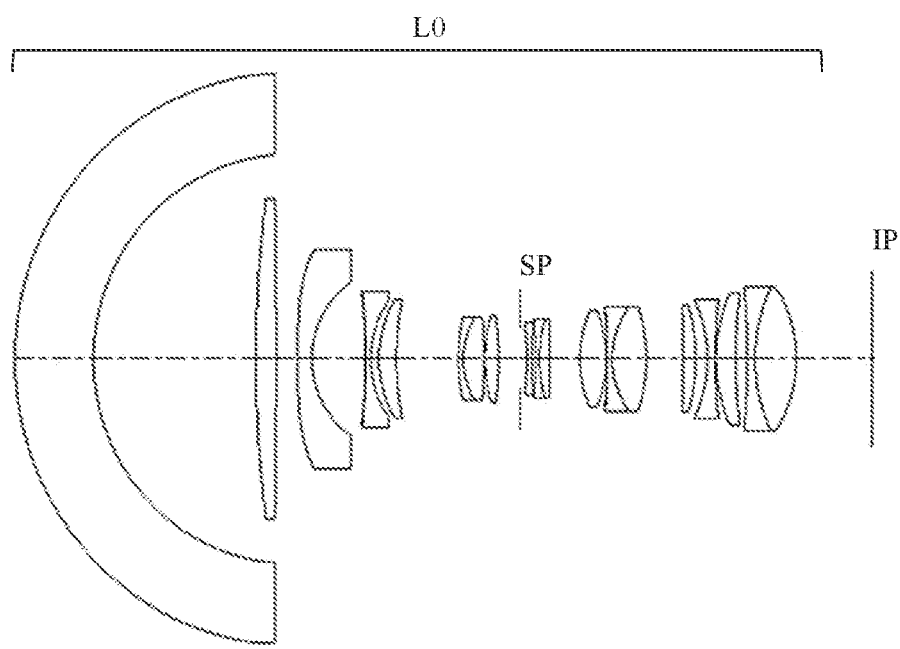
Figure 1C:
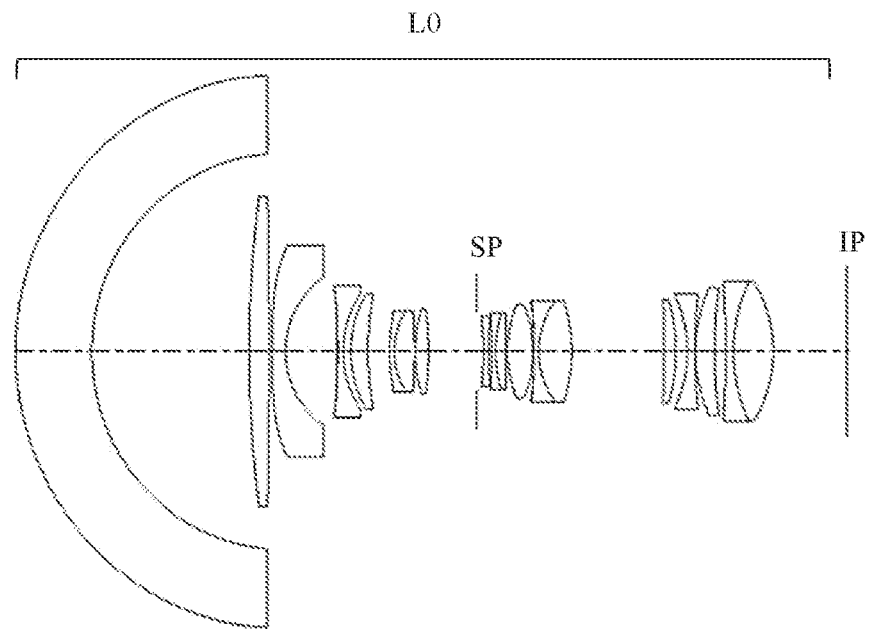
Figure 3A:
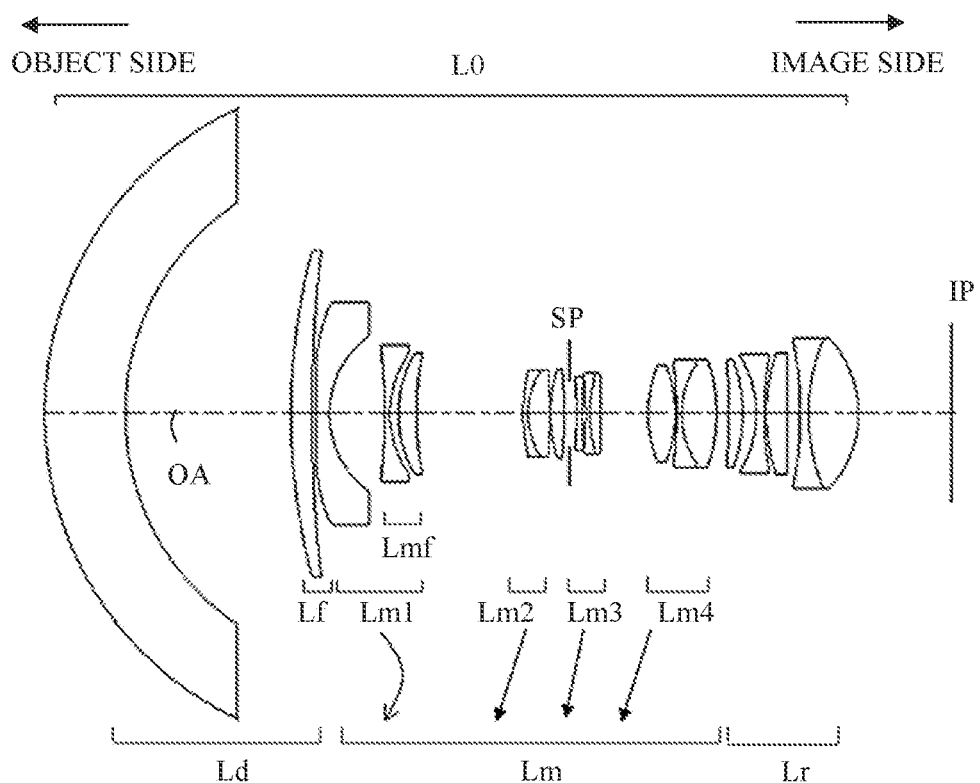
FIGS. 3A to 3C are sectional views of an imaging optical system according to Example 2 at a wide-angle end, an intermediate focal length, and a telephoto end.
Figure 3B:
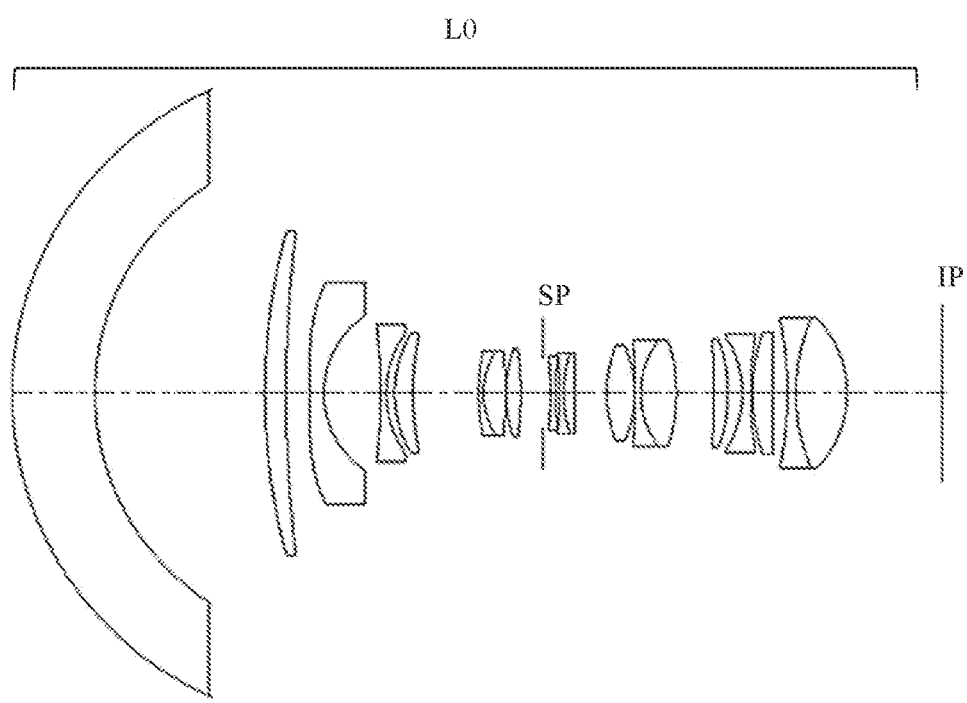
Figure 3C:
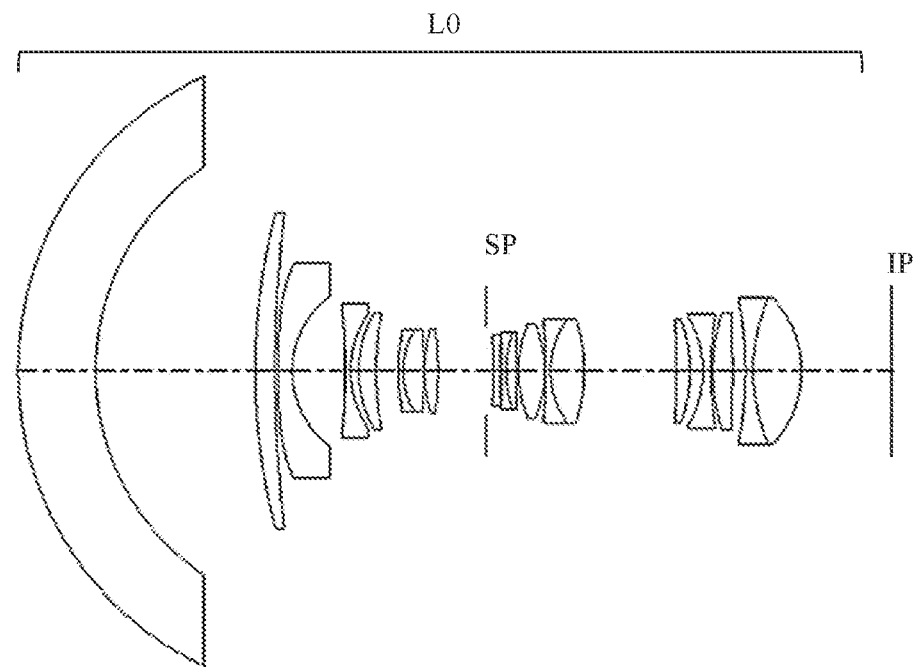
Figure 5A:
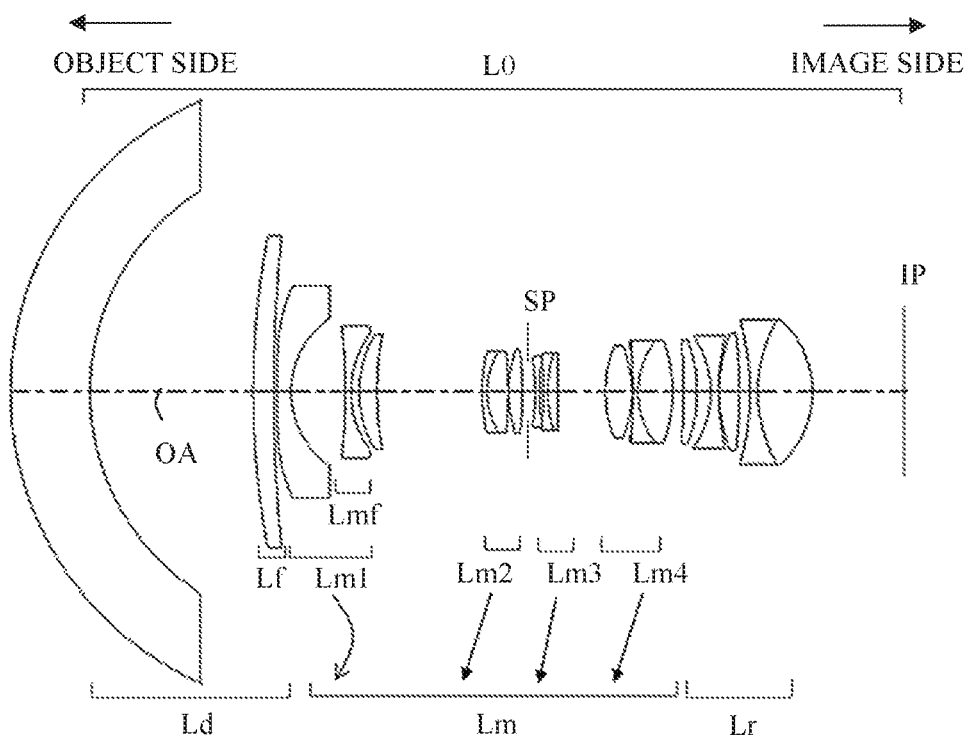
FIGS. 5A to 5C are sectional views of an imaging optical system according to Example 3 at a wide-angle end, an intermediate focal length, and a telephoto end.
Figure 5B:
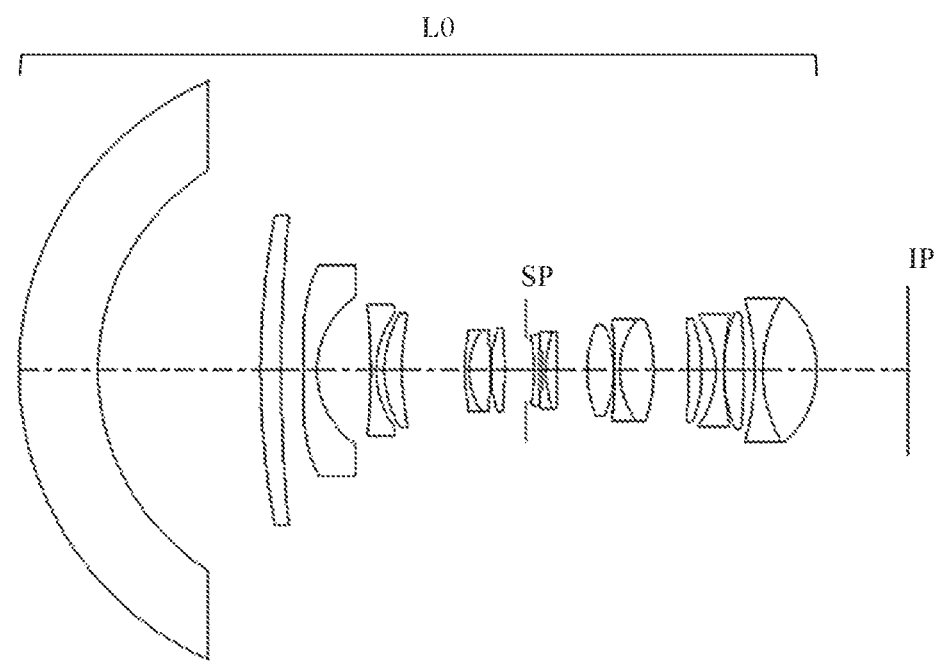
Figure 5C:
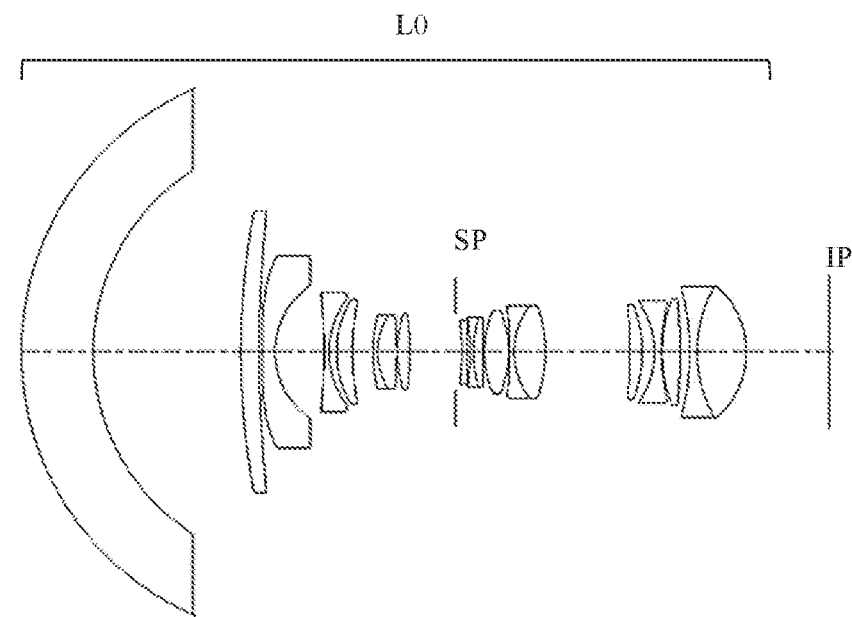

Next follows a description of the attachment optical system and the image pickup apparatus according to each example of the present invention. FIGS. 1A, 3A, and 5A are sectional views taken along the wide-angle end of the optical systems L0 according to Examples 1 to 3 that is in-focus (on an object) at infinity. FIGS. 1B, 3B, and 5B are sectional views at an intermediate focal length of the optical systems L0 according to Examples 1 to 3 that is in-focus at infinity. FIGS. 1C, 3C, and 5C are sectional views at the telephoto end of the optical systems L0 according to Examples 1 to 3 that is in-focus at infinity. The optical system according to each example is an optical system used for an image pickup apparatus such as a digital video camera, a digital still camera, a broadcasting camera, a silver salt film camera, and a surveillance camera.

In each sectional view, the left side is the object side and the right side is the image side. The optical system according to each example includes a plurality of lens units. In each example, the lens unit is a group of lenses that integrally move or stand still during zooming or focusing. That is, in the optical system according to each example, a distance between adjacent lens units changes during focusing from infinity to a short distance. The lens unit may include one or more lenses. The lens unit may include an aperture stop (diaphragm).

The optical system L0 according to each example includes, in order from the object side to the image side, a dome-shaped housing Ld, a front converter lens Lf disposed in front (object side) of an imaging optical system Lm, the imaging optical system Lm, and a rear converter lens Lr disposed behind (image side of) the imaging optical system Lm. The dome-shaped housing Ld is a dome-shaped cover and is used adjacent to a medium such as water. That is, the outside of the dome-shaped housing Ld is the water, and the inside of it is the air when the optical system L0 is used. The imaging optical system Lm is designed to provide an optimum performance in the air. The front converter lens Lf includes at least one positive lens. The dome-shaped housing Ld and the front converter lens Lf form a first converter optical system. The rear converter lens Lr serves as a second converter optical system. The attachment optical system according to each example includes the first converter optical system (Ld+Lf) attachable to the object side of the imaging optical system Lm and the second converter optical system (Lr) attachable to the image side of the imaging optical system Lm.

In each sectional view, Lmi represents an i-th lens unit ("i" is a natural number) counted from the object side among the lens units included in the imaging optical system Lm. In each example, Lm1 is a first lens unit having a negative refractive power, Lm2 is a second lens unit having a positive refractive power, Lm3 is a third lens unit having a negative refractive power, and L4 is a fourth lens unit having a positive refractive power. The imaging optical system Lm includes the first lens unit L1 to the fourth lens unit L4. During focusing from infinity to the short distance, the focus lens unit Lmf in the first lens unit Lmi moves to the object side. During zooming from the wide-angle end to the telephoto end, the second lens unit Lm2 and the fourth lens unit Lm4 move to the object side in the same trajectory. The third lens Lm3 moves to the object side with a trajectory different from that of each of the second lens unit and the fourth lens unit. The first lens unit Lm1 moves along a locus that is convex on the image side. Each of the dome-shaped housing Ld, the front converter lens Lf, and the rear converter lens Lr is fixed during zooming and focusing.

SP is an aperture stop (diaphragm). IP is an image plane, and when the optical system L0 according to each example is used as an imaging optical system for a digital still camera or a digital video camera, an imaging plane of a solid-state image sensor (photoelectric conversion element) such as a CCD sensor or a CMOS sensor is placed on the image plane IP. When the optical system L0 according to each example is used as an imaging optical system for a film-based camera, a photosensitive plane corresponding to a film plane is placed on the image plane IP.

The optical system L0 according to each example is configured to move at least one lens unit in the imaging optical system Lm during focusing. In the imaging optical system Lm, the lens unit that moves during focusing will be referred to as a focus lens unit Lmf hereinafter. Arrows shown in each sectional view indicate moving directions of the lens units during zooming from the wide-angle end to the telephoto end. The focus lens unit Lmf moves toward the object during focusing.

Figure 2A:
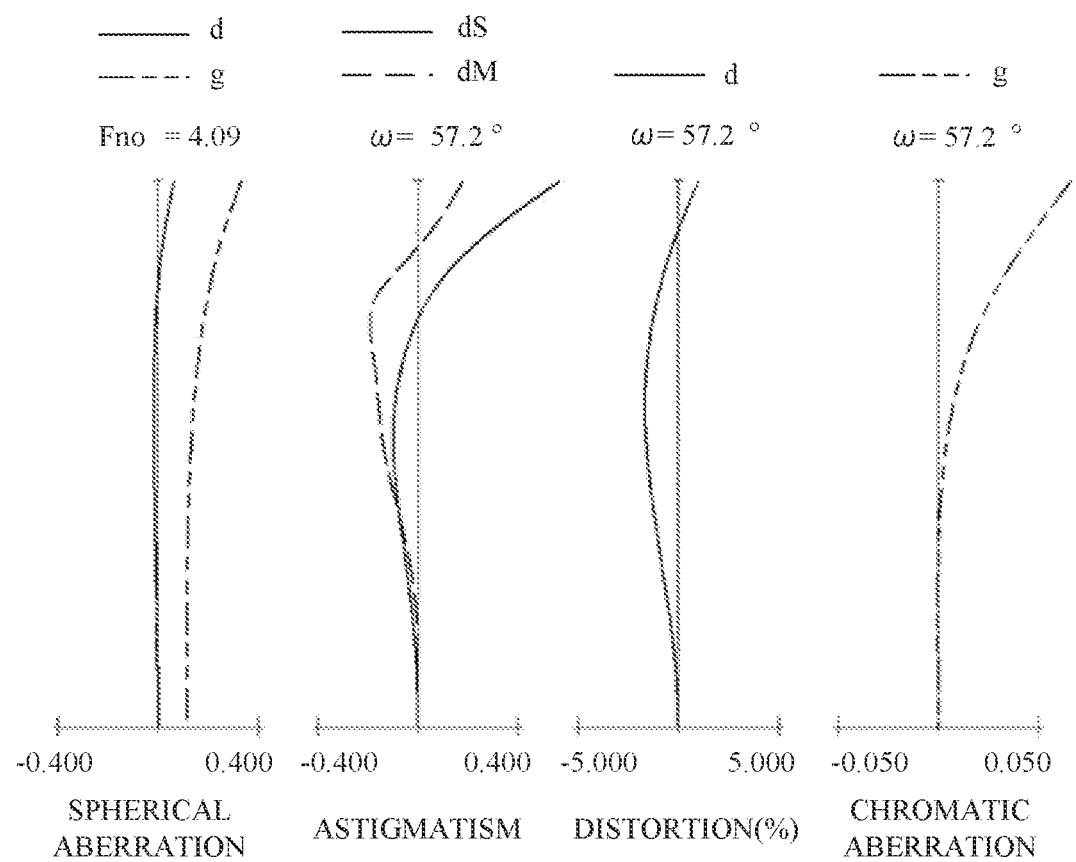
FIGS. 2A to 2C are aberration diagrams of the imaging optical system according to Example 1 at the wide-angle end, the intermediate focal length, and the telephoto end.
Figure 2B:
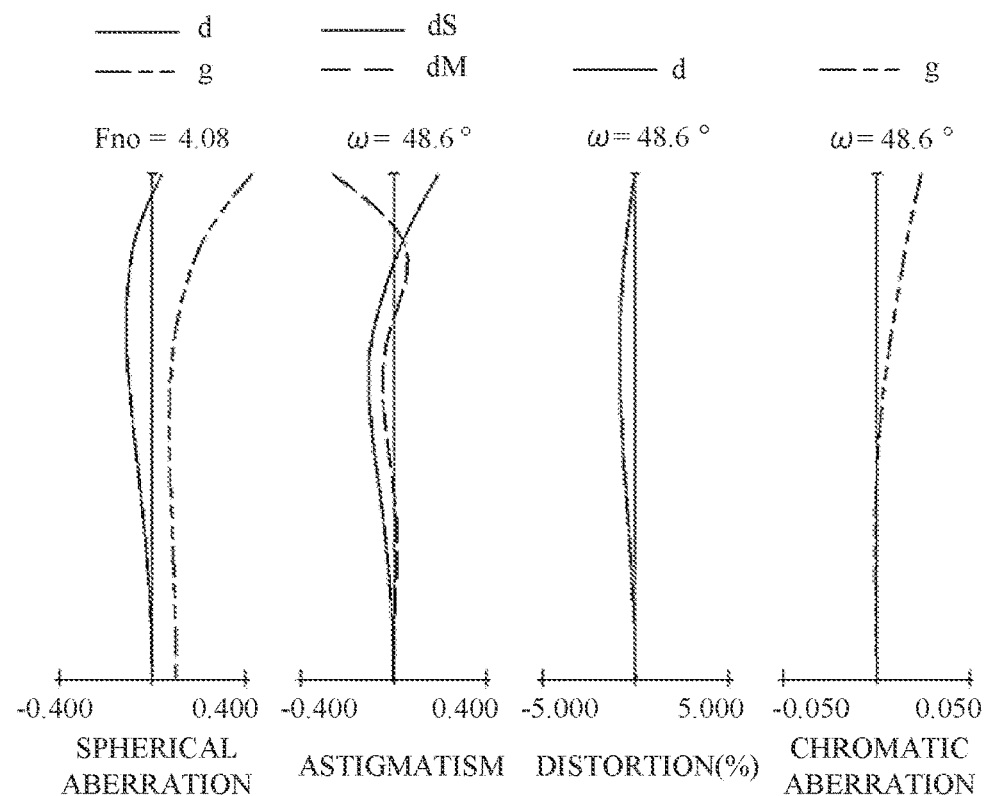
Figure 2C:
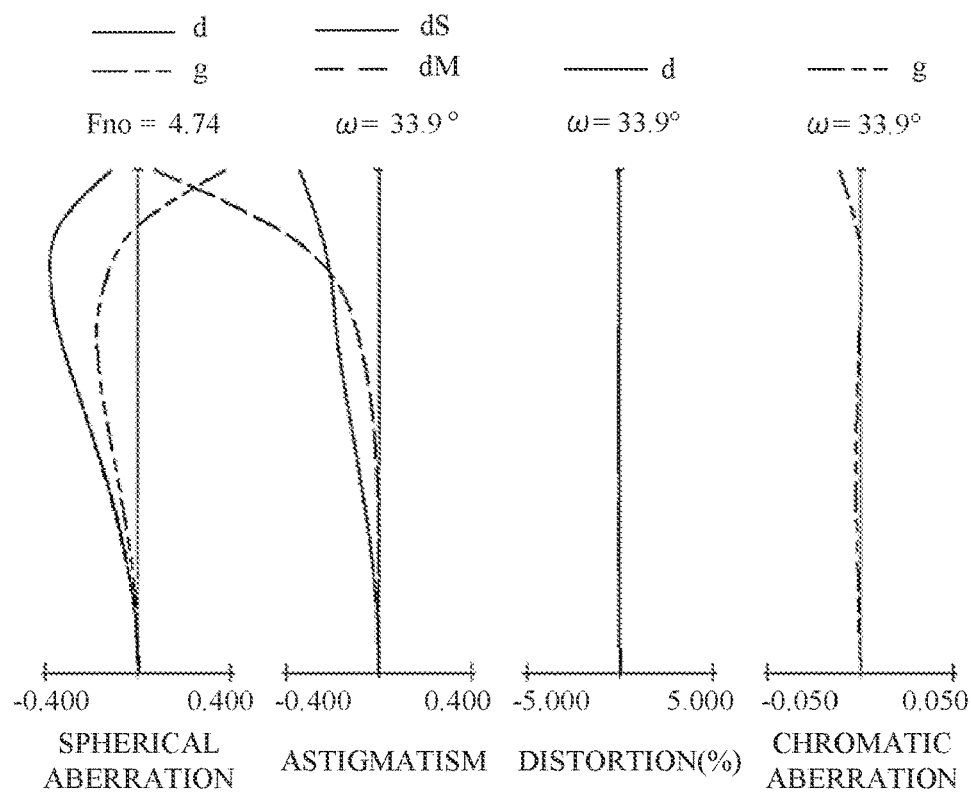
Figure 4A:
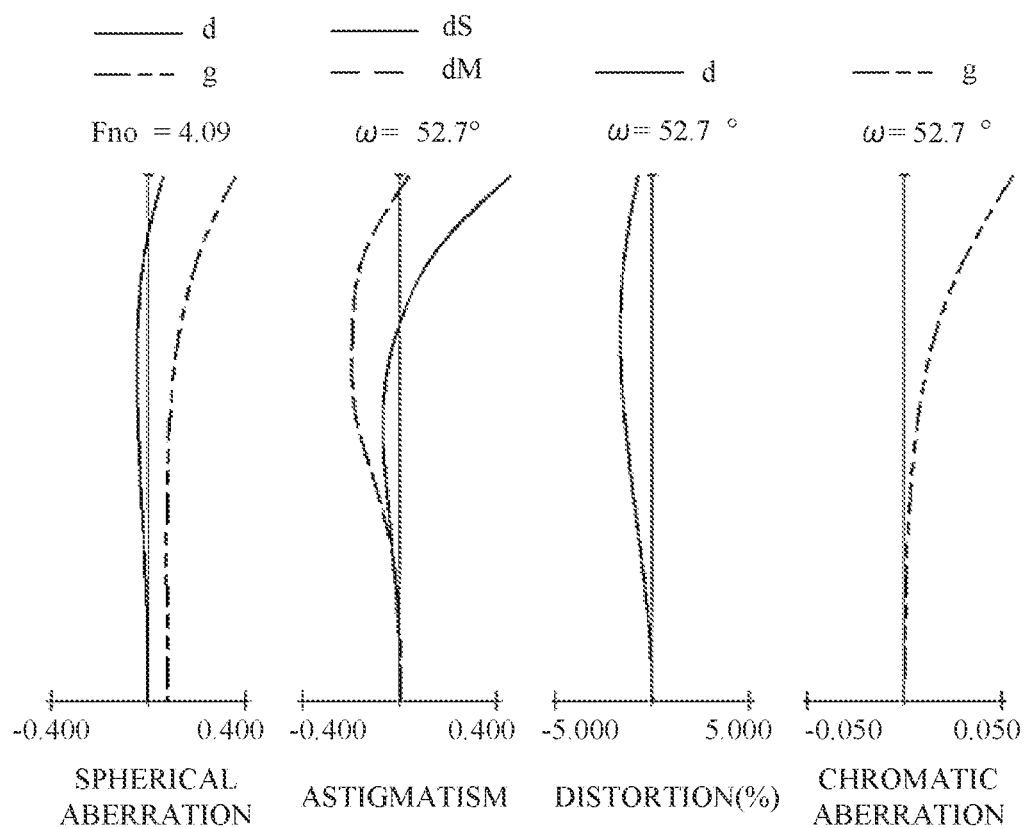
FIGS. 4A to 4C are aberration diagrams of the imaging optical system according to Example 2 at the wide-angle end, the intermediate focal length, and the telephoto end.
Figure 4B:
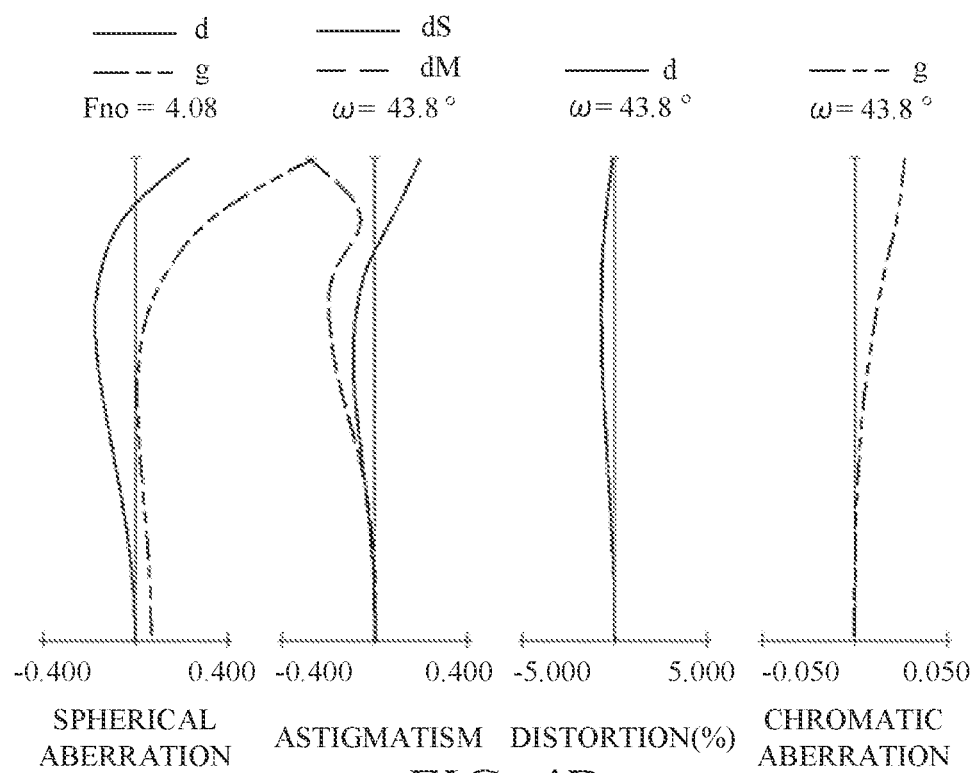
Figure 4C:
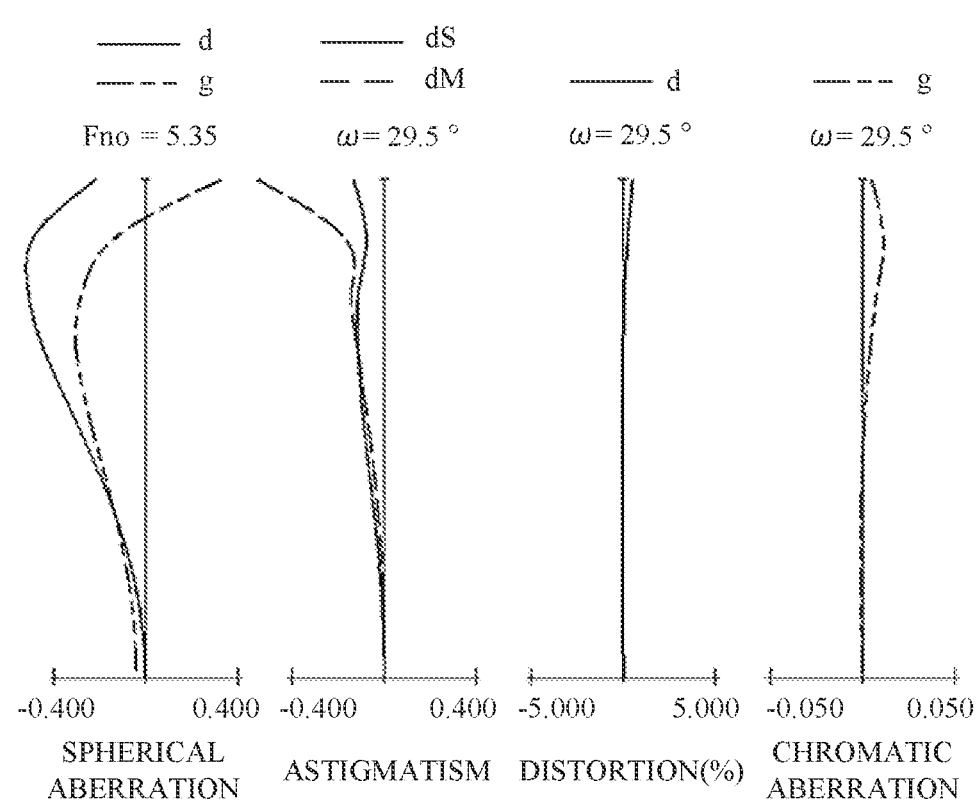
Figure 6A:
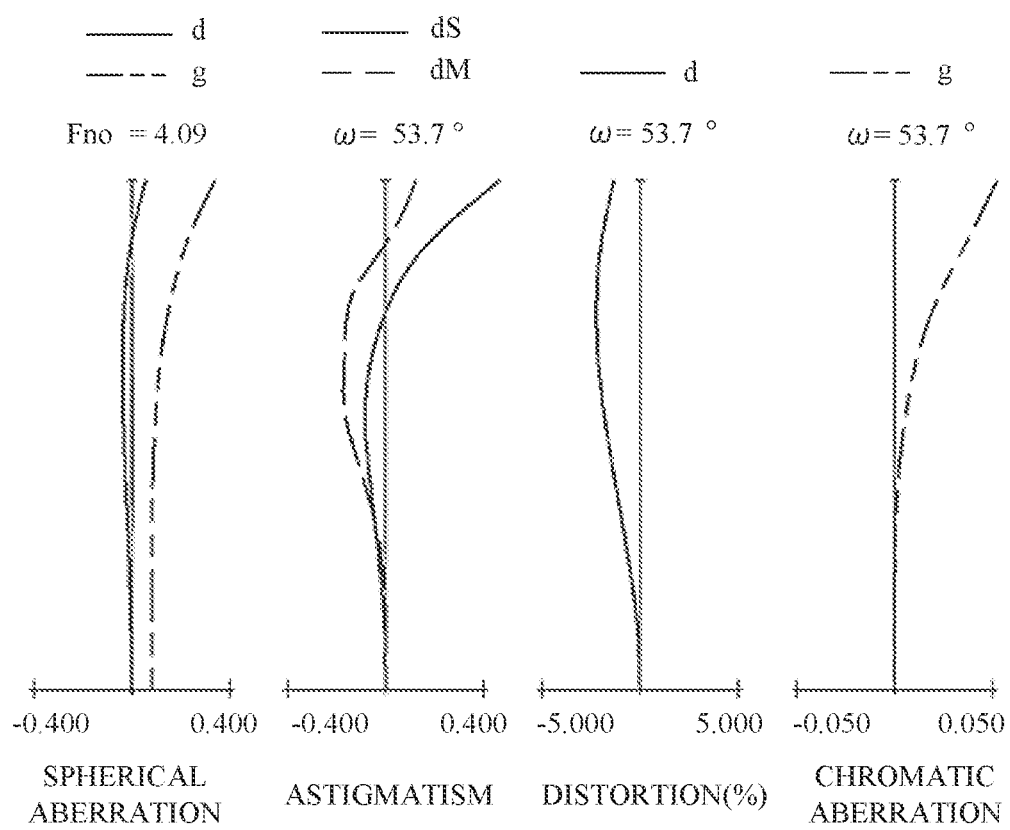
FIGS. 6A to 6C are aberration diagrams of the imaging optical system according to Example 3 at the wide-angle end, the intermediate focal length, and the telephoto end.
Figure 6B:
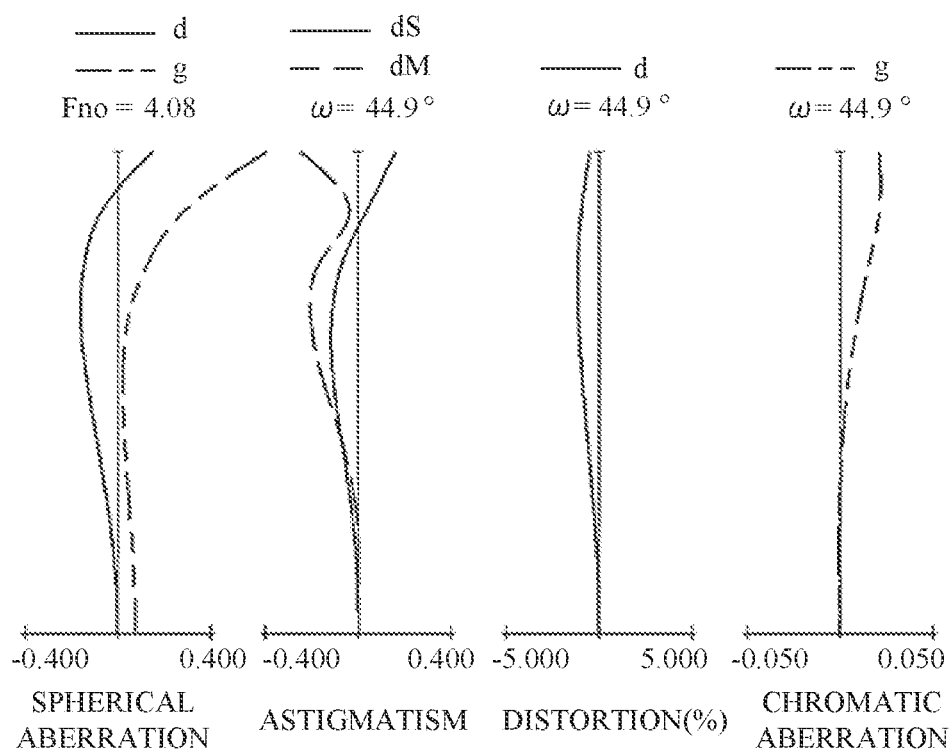
Figure 6C:
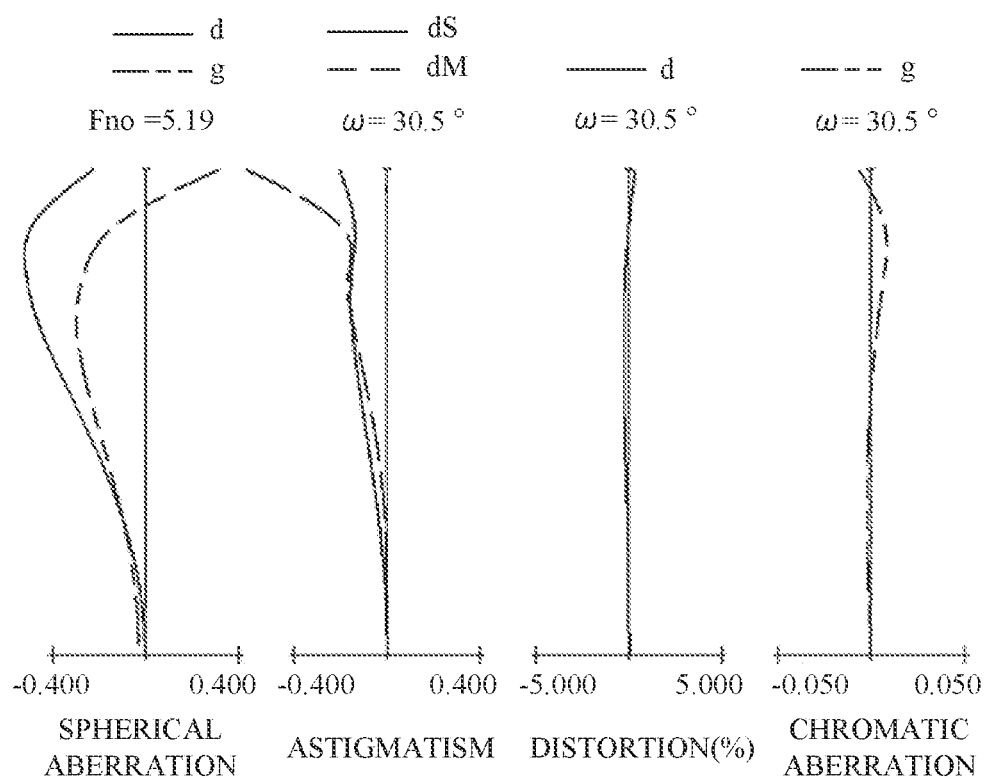

FIGS. 2A, 4A, and 6A are aberration diagrams at the wide-angle end of the optical systems L0 according to Examples 1 to 3 that is in-focus at infinity. FIGS. 2B, 4B, and 6B are aberration diagrams at an intermediate focal length of the optical systems L0 according to Examples 1 to 3 that is in-focus at infinity. FIGS. 2C, 4C, and 6C are aberration diagrams at the telephoto end of the optical systems L0 according to Examples 1 to 3 that is in-focus at infinity.

The spherical aberration diagram indicates a spherical aberration amount for the d-line (wavelength 587.6 nm) and the g-line (wavelength 435.8 nm), while Fno is an F-number. In the astigmatism diagram, dS indicates an astigmatism amount on a sagittal image plane, and dM indicates an astigmatism amount on a meridional image plane. The distortion diagram shows a distortion amount for the d-line. The chromatic aberration diagram shows a chromatic aberration amount for the g-line. ω is an imaging half angle of view (°).

A description will be given of a characteristic configuration of the optical system L0 according to each example. The following conditional expression (1) is satisfied:

$$0.00<|fd/ffc|<0.50 \quad (1)$$

where fd is a focal length of the dome-shaped housing Ld in the water (with a refractive index of 1.33) (which is a focal length when the outside of the dome-shaped housing Ld is water and the inside is the air), and ffc is a focal length of a front converter lens (at least one positive lens).

A description will now be given of a technical meaning of the conditional expression (1). The conditional expression (1) shows a ratio of the focal length fd of the dome-shaped housing Ld in the water to the focal length of the front converter lens Lf, and is a conditional expression for balancing the correction of the focus position and the correction of distortion in the water. When the positive refractive power of the front converter lens Lf is so strong that the value is higher than the upper limit in the conditional expression (1), a moving amount of the focus lens unit Lmf in the imaging optical system Lm is small for the focus correction. However, a large distortion occurs in the positive direction, and it becomes difficult to correct the distortion with the rear converter lens Lr.

The numerical range of the conditional expression (1) may be set as follows:

$$0.10<|fd/ffc|<0.45 \quad (1a)$$

The numerical range of the conditional expression (1) may be set as follows:

$$0.20<|fd/ffc|<0.40 \quad (1b)$$

A description will now be given of the conditions which the optical system L0 according to each example may satisfy. The following conditional expressions (2) and (3) may be satisfied:

$$5<|ffm/fwm|<50 \quad (2)$$

$$5<|frm/fwm|<500 \quad (3)$$

where ffm is a focal length of the first converter optical system (Ld+Lf) in the water (composite focal length of the dome-shaped housing Ld and the front converter lens Lf in the water), fwm is a focal length of the imaging optical system Lm in the air (at the wide-angle end when the imaging optical system Lm is a zoom lens), and frm is a focal length of the rear converter lens Lr.

In each example, the rear converter lens Lr has at least one positive lens (convex lens) and at least one negative lens (concave lens). The following conditional expression (4) may be satisfied:

$$Ndp<Ndn \quad (4)$$

where Ndn is an average refractive index of the at least one negative lens in the rear converter lens Lr (the average value of the refractive indexes of all negative lenses in the rear converter lens Lr), and Ndp is an average refractive index of the at least one positive lens in the rear converter lens Lr (the average value of the refractive indexes of all positive lenses in the rear converter lens Lr).

The following conditional expression (5) may be satisfied:

$$1.00<Skcw/Skkm<1.80 \quad (5)$$

where Skcw is a distance from the lens closest to the image plane in the imaging optical system Lm to which the attachment optical system is attached, to the image plane, and Skkm is a backfocus of the imaging optical system Lm to which the attachment optical system is not attached.

The following conditional expression (6) may be satisfied:

$$0.25 \leq Skmw/tdmw<1.20 \quad (6)$$

where Skmw is a backfocus of the imaging optical system Lm to which the attachment optical system is not attached, and tdmw is a distance from the lens closest to the object to the lens closest to the image plane in the imaging optical system Lm.

The following conditional expression (7) may be satisfied:

$$0.70<fwc/fwm<1.00 \quad (7)$$

where fwc is a focal length of the optical system (the optical system to which the attachment optical system is attached (attachment optical system+imaging optical system Lm)) in the water, and fwm is a focal length of the imaging optical system Lm in the air.

A description will be given of the technical meanings of the conditional expressions (2) to (7). The conditional expression (2) represents a ratio of the focal length of the first converter optical system disposed in front of the imaging optical system L0 to the focal length of the imaging optical system Lm, and a condition that indicates a proper refractive power distribution of the attachment optical system. If the refractive power of the front converter lens Lf is so strong that the value is higher than the upper limit in the conditional expression (2), it becomes difficult to correct the distortion. On the other hand, if the refractive power of the front converter lens Lf is so weak that the value is lower than the lower limit in the conditional expression (2), a moving amount of the focus lens unit Lmf in the imaging optical system Lm becomes large in order to correct the focus position, and the shortest imaging distance in the air cannot be secured in the water. In addition, the aberrational fluctuations become large due to focusing.

The conditional expression (3) defines a ratio between the focal length of the rear converter lens Lr disposed behind the imaging optical system Lm and the focal length of the imaging optical system Lm, and a condition that indicates a proper refractive power distribution of the attachment optical system. If the refractive power of the rear converter lens Lr is so strong that the value is higher than the upper limit in the conditional expression (3), it becomes difficult to correct the curvature of field. On the other hand, if the refractive power of the front converter lens Lf is so weak that the value is lower than the lower limit of the conditional expression (3), the optical system L0 would be large.

The conditional expression (4) indicates the refractive index of the glass materials in the convex lens (positive lens) and the concave lens (negative lens) in the rear converter lens Lr, and a conditional expression relating to the correction of the curvature of field by the rear converter lens Lr. The conditional expression (4) can make the Petzval sum of the optical system L0 close to positive, and contribute to the correction of the image plane that is significantly curved toward the overexposure side in the water.

The conditional expression (5) defines a ratio of the distances from the final lens of the imaging optical system Lm to the image plane before and after the rear converter lens Lr is attached, and a conditional expression relating to the focusing amount caused by moving the focus lens unit Lmf in the imaging optical system Lm. If the value is higher than the upper limit or lower than the lower limit in the conditional expression (5), the rear converter lens Lr will have a strong negative or positive refractive power, respectively, and it becomes difficult to correct various aberrations. In addition, the imaging magnification of the rear converter lens Lr increases, the focusing amount more significantly changes due to the movement of the focus lens unit Lmf than that in the air, and negatively affects the AF performance of the image pickup apparatus.

The conditional expression (6) defines a ratio of the overall lens length of the imaging optical system Lm to the backfocus, and a conditional expression relating to the arrangement of the attachment optical system according to each example. If the backfocus of the imaging optical system Lm is long and the value is higher than the upper limit in the conditional expression (6), a strong refractive power is required for the rear converter lens Lr. As a result, the focusing amount caused by the movement of the focus lens unit Lmf of the imaging optical system Lm more significantly changes than that in the air depending on the imaging magnification of the rear converter lens Lr, and negatively affects the AF performance. On the other hand, if the backfocus is so short that the value is lower than the lower limit in the conditional expression (6), a proper refractive power cannot be distributed to the rear converter lens Lr, and it becomes difficult to effectively correct the curvature of field in the overexposure direction in the water.

The conditional expression (7) defines a ratio of the focal lengths of the wide-angle ends of the optical system L0 in the air and water, and a conditional expression that makes the image field in the water closer to that in the air. If the focal length in the air is so close that the value is higher than the upper limit in the conditional expression (7), it becomes difficult to secure the angle of view in the air. On the other hand, if the focal length in the water is short and the value is lower than the lower limit in the conditional expression (7), the negative refractive power in front of the imaging optical system Lm becomes large, and the correction of the curvature of field changed to the overexposure side underwater becomes insufficient.

The numerical range of the conditional expressions (2) to (7) may be set as follows.

$$5<|ffm/fwm|<20 \tag{2a}$$

$$5<|frm/fwm|<400 \tag{3a}$$

$$1.00<Skcw/Skmw<1.60 \tag{5a}$$

$$0.25 \leq Skmw/tdmw<0.80 \tag{6a}$$

$$0.70<fwc/fwm<0.98 \tag{7a}$$

The numerical range of the conditional expression (2) to (7) may be set as follows.

$$10<|ffm/fwm|<16 \tag{2b}$$

$$10<|frm/fwm|<300 \tag{3b}$$

$$1.00<Skcw/Skmw<1.50 \tag{5b}$$

$$0.25<Skmw/tdmw<0.50 \tag{6b}$$

$$0.70<fwc/fwm<0.95 \tag{7b}$$

In each example, the imaging optical system Lm does not change before and after the attachment optical system is attached. That is, the optical elements in the imaging optical system Lm do not change before and after the attachment optical system is attached, or the zoom locus does not change when the imaging optical system Lm is a zoom lens.

The optical system according to each example is manufactured through the following steps. First, at least one positive lens (front converter lens Lf) in the first converter optical system is attached to the object side of the imaging optical system Lm. Next, the second converter optical system (rear converter lens Lr) is attached to the image side of the imaging optical system Lm. Finally, the dome-shaped cover (dome-shaped housing Ld) in the first converter optical system is attached to the object side of the imaging optical system Lm.

Next follows a description of Numerical Examples 1 to 3 corresponding to Examples 1 to 3, respectively. In surface data of each numerical example, r represents a radius of curvature of each optical surface, and d (mm) represents an axial distance (distance on the optical axis) between an m-th surface and an (m+1)-th surface. However, m is the number of the surface counted from the light incident side. Further, nd represents a refractive index of each optical element for the d-line, and vd represents an Abbe number of the optical member. The Abbe number vd of a certain material is expressed as follows:

$$vd=(Nd-1)/(NF-NC)$$

where Nd, NF, and NC are refractive indexes for the d-line (587.6 nm), the F-line (486.1 nm), and the C-line (656.3 nm) in the Fraunhofer line:

In each numerical example, d, focal length (mm), F-number, and half angle of view (°) have values when the optical system L0 according to each example focuses on an object at infinity. A backfocus BF is the distance from the final lens surface to the image surface. An overall lens length has a value obtained by adding the backfocus to the distance from the first lens surface to the final lens surface.

The aspherical shape is expressed by the following expression (A), where x is the displacement in the optical axis direction at the position of the height h from the optical axis OA based on the surface apex, R is a paraxial radius of curvature, k is a conical constant, and A4, A6, A8, A10, and A12 are aspherical coefficients:

$$x=(h^2/R)/[1+\{1-(1+k)(h/R)^2\}^{1/2}]+A4h^4+A6h^6+A8h^8+A10h^{10}+A12h^{12}+A14h_{14} \tag{A}$$

"e±XX" in each aspherical coefficient means "×10$^{±XX}$".

Table 1 shows the value of each conditional expression in each numerical example.

Numerical Example 1

| | | UNIT mm Surface data | | | |
|---|---|---|---|---|---|
| Surface number | r | d | nd | vd | Effective Diameter |
| 1 | 70 | 20 | 1.49171 | 57.4 | 142.9 |
| 2 | 50 | 41.37 | 1 | 0 | 98.2 |
| 3 | 300.671 | 5.19 | 1.6968 | 55.5 | 77 |
| 4 | −2274.201 | (variable) | 1 | 0 | 77 |
| 5* | 12826.238 | 3.5 | 1.58373 | 59.4 | 52.11 |
| 6 | 22.591 | (variable) | 1 | 0 | 36.08 |
| 7* | −210.437 | 0.1 | 1.524.21 | 51.4 | 31.9 |
| 8 | −146.091 | 1.3 | 1.7725 | 49.6 | 31.83 |
| 9 | 24.773 | 2.09 | 1 | 0 | 27.93 |
| 10 | 28.493 | 4.45 | 1.84666 | 23.9 | 27.83 |
| 11 | 72.575 | (variable) | 1 | 0 | 26.74 |
| 12 | 45.228 | 1.2 | 1.72825 | 28.5 | 18.5 |
| 13 | 18.666 | 5.35 | 1.51633 | 64.1 | 18.73 |
| 14 | −133.407 | 0.15 | 1 | 0 | 19.39 |
| 15 | 34.369 | 3.49 | 1.6779 | 55.3 | 20.06 |
| 16 | −89.333 | (variable) | 1 | 0 | 19.99 |
| 17(diaphragm) | ∞ | 1.87 | 1 | 0 | 16.69 |
| 18 | −66.891 | 1.25 | 1.71999 | 50.2 | 16.35 |
| 19 | 81.615 | 0.93 | 1 | 0 | 16.44 |
| 20 | −88.722 | 1 | 1.6223 | 53.2 | 16.53 |
| 21 | 32.152 | 2.6 | 1.80518 | 25.4 | 17.77 |
| 77 | 2189.196 | (variable) | 1 | 0 | 18.28 |
| 23 | 29.94 | 6.72 | 1.43875 | 94.9 | 21.51 |
| 24 | −29.94 | 0.15 | 1 | 0 | 22.16 |
| 25* | −622.972 | 0.15 | 1.52421 | 51.4 | 22.19 |
| 26 | −128.586 | 1.2 | 1.834 | 37.2 | 22.21 |
| 27 | 20.96 | 8.71 | 1.48749 | 70.2 | 22.86 |
| 28 | −38.77 | (variable) | 1 | 0 | 24.58 |
| 29 | −276.543 | 3.14 | 1.95375 | 32.3 | 25 |
| 30 | −44.836 | 3.02 | 1 | 0 | 25 |
| 31 | −32.314 | 2 | 1.90525 | 35 | 28 |
| 32 | 131.609 | 0.13 | 1 | 0 | 28 |
| 33 | 38.434 | 5 | 1.7783 | 23.9 | 31 |
| 34 | 112.543 | 2.96 | 1 | 0 | 31 |
| 35 | −209.899 | 2 | 1.95375 | 32.3 | 34 |
| 36 | 40.103 | 10.5 | 1.51742 | 52.4 | 34 |
| 37 | −32.145 | (variable) | | | 34 |
| Image plane | ∞ | | | | |

ASPHERIC DATA

5th surface

K 0.00E+00  A4 1.358E−05  A6 −1.792E−08  A8 2.412E−11  A10 −2.010E−14  A12 7.860E−18

7th surface

K 0.00E+00  A4 −9.21E−06  A6 2.504E−08  A8 −1.838E−11  A10 −6.640E−15

25th surface

K 0.00E+00  A4 −2.20E−05  A6 −2.588E−08  A8 −1.363E−11  A10 2.925E−13

| VARIOUS DATA Zoom ratio 2.32 | | | |
|---|---|---|---|
| | Wide-angle | Middle | Telephoto |
| Focal length | 13.92 | 19.05 | 32.23 |
| F-NUMBER | 4.09 | 4.08 | 4.74 |
| Half male of view | 57.25 | 48.64 | 33.87 |
| Image height | 21.64 | 21.64 | 21.64 |
| Overall lens length | 218.23 | 218.23 | 218.23 |
| BF | 19.19 | 19.19 | 19.19 |
| d4 | 0.86 | 5.56 | 0.86 |
| d6 | 13.63 | 13.63 | 13.63 |
| d11 | 26.47 | 15.78 | 5.74 |
| d16 | 1.24 | 5.36 | 12.63 |
| d22 | 11.88 | 7.76 | 0.49 |
| d28 | 3.45 | 9.44 | 24.19 |
| d37 | 19.19 | 19.19 | 19.19 |

-continued

| | | | |
|---|---|---|---|
| Entrance pupil position | 82.56 | 85.56 | 82.97 |
| Exit pupil position | −87.54 | −79.46 | −78.68 |
| Front principal position | 98.71 | 106.14 | 112.51 |
| Rear principal position | 6.22 | 2.02 | −7.75 |

ZOOM LENS UNIT DATA

| Unit | Starting surface | Focal length | Lens structure length | Front principal point position | Rear principal point position |
|---|---|---|---|---|---|
| 1 | 1 | −254.4 | 66.56 | −9.21 | −72.14 |
| 2 | 5 | −38.77 | 3.5 | 2.21 | 0 |
| 3 | 7 | −62.01 | 7.94 | −0.11 | −5.32 |
| 4 | 12 | 28.82 | 10.19 | 4.12 | −2.52 |
| 5 | 17 | −46.91 | 7.65 | 2.17 | −3.41 |
| 6 | 23 | 47.74 | 16.93 | 5.12 | −7.27 |
| 7 | 29 | 5042.05 | 28.74 | 411.2 | 424.01 |

SINGLE LENS DATA

| Lens | Starting surface | Focal length |
|---|---|---|
| 1 | 1 | −137.58 |
| 2 | 3 | 381.38 |
| 3 | 5 | −38.77 |
| 4 | 7 | 910.93 |
| 5 | 8 | −27.33 |
| 6 | 10 | 52.95 |
| 7 | 12 | −44.49 |
| 8 | 13 | 32.1 |
| 9 | 15 | 37.04 |
| 10 | 18 | −50.88 |
| 11 | 20 | −37.8 |
| 12 | 21 | 40.5 |
| 13 | 23 | 35.33 |
| 14 | 25 | 309.06 |
| 15 | 26 | −21.53 |
| 16 | 27 | 29.31 |
| 17 | 29 | 55.74 |
| 18 | 31 | −28.49 |
| 19 | 33 | 72.84 |
| 20 | 35 | −35.17 |
| 21 | 36 | 36.28 |

Numerical Example 2

| | | UNIT mm Surface data | | | |
|---|---|---|---|---|---|
| Surface number | r | d | nd | vd | Effective Diameter |
| 1 | 80 | 20 | 1.49171 | 57.4 | 142.9 |
| 2 | 60 | 41.07 | 1 | 0 | 98.2 |
| 3 | 150.322 | 5.15 | 1.51633 | 64.1 | 77 |
| 4 | 333.524 | (variable) | 1 | 0 | 77 |
| 5* | 12826.238 | 3.5 | 1.58373 | 59.4 | 52.11 |
| 6 | 22.591 | (variable) | 1 | 0 | 36.08 |
| 7* | −210.437 | 0.1 | 1.52421 | 51.4 | 31.9 |
| 8 | −146.091 | 1.3 | 1.7725 | 49.6 | 31.83 |
| 9 | 24.773 | 2.09 | 1 | 0 | 27.93 |
| 10 | 28.493 | 4.45 | 1.84666 | 23.9 | 27.83 |
| 11 | 72.575 | (variable) | 1 | 0 | 26.74 |
| 12 | 45.228 | 1.2 | 1.72825 | 28.5 | 18.5 |
| 13 | 18.666 | 5.35 | 1.51633 | 64.1 | 18.73 |
| 14 | −133.407 | 0.15 | 1 | 0 | 19.39 |
| 15 | 34.369 | 3.49 | 1.6779 | 55.3 | 20.06 |
| 16 | −89.333 | (variable) | 1 | 0 | 19.99 |
| 17(diaphragm) | ∞ | 1.87 | 1 | 0 | 16.69 |
| 18 | −66.891 | 1.25 | 1.71999 | 50.2 | 16.35 |
| 19 | 81.615 | 0.93 | 1 | 0 | 16.44 |
| 20 | −88.722 | 1 | 1.6223 | 53.2 | 16.53 |
| 21 | 32.152 | 2.6 | 1.80518 | 25.4 | 17.77 |
| 22 | 2189.196 | (variable) | 1 | 0 | 18.28 |
| 23 | 29.94 | 6.72 | 1.43875 | 94.9 | 21.51 |
| 24 | −29.94 | 0.15 | 1 | 0 | 22.16 |

| | | | | | |
|---|---|---|---|---|---|
| 25* | −622.972 | 0.15 | 1.57421 | 51.4 | 22.19 |
| 26 | −128.586 | 1.2 | 1.834 | 37.2 | 22.21 |
| 27 | 20.96 | 8.71 | 1.48749 | 70.2 | 22.86 |
| 28 | −38.77 | (variable) | 1 | 0 | 24.58 |
| 29 | −197.923 | 3.45 | 1.95375 | 32.3 | 25 |
| 30 | −37.201 | 3.38 | 1 | 0 | 25 |
| 31 | −25.709 | 2 | 1.91082 | 35.3 | 27 |
| 32 | 80.995 | 0.52 | 1 | 0 | 27 |
| 33 | 46.032 | 5 | 1.7783 | 23.9 | 28 |
| 34 | −1933.738 | 3.41 | 1 | 0 | 28 |
| 35 | −87.791 | 2 | 1.83481 | 42.7 | 35 |
| 36 | 44.99 | 12.41 | 1.497 | 81.5 | 35 |
| 37 | −26.06 | (variable) | 1 | 0 | 35 |
| Image plane | ∞ | | | | |

ASPHERIC DATA

5th surface

K 0.00E+00   A4 1.358E−05   A6 −1.792E−08   A8 2.412E−11   A10 −2.010E−14   A12 7.860E−18

7th surface

K 0.00E+00   A4 −9.211E−06   A6 2.504E−08   A8 −1.838E−11   A10 −6.640E−15

25th surface

K 0.00E+00   A4 −2.200E−05   A6 −2.588E−08   A8 −1.363E−11   A10 2.925−13

VARIOUS DATA
Zoom ratio 2.32

| | Wide-angle | Middle | Telephoto |
|---|---|---|---|
| Focal length | 16.46 | 22.53 | 38.16 |
| F-NUMBER | 4.09 | 4.08 | 5.35 |
| Half angle of view | 52.74 | 43.83 | 29.55 |
| Image height | 21.64 | 21.64 | 21.64 |
| Overall lens length | 224.75 | 224.75 | 224.75 |
| BF | 23.05 | 23.05 | 23.05 |
| d4 | 0.86 | 5.56 | 0.86 |
| d6 | 13.63 | 13.63 | 13.63 |
| d11 | 26.47 | 15.78 | 5.74 |
| d16 | 1.24 | 5.36 | 12.63 |
| d22 | 11.88 | 7.76 | 0.49 |
| d28 | 3.02 | 9 | 23.76 |
| d37 | 23.05 | 23.05 | 23.05 |
| Entrance pupil position | 86 | 89.3 | 86.46 |
| Exit pupil position | −106.6 | −97.19 | −96.28 |
| Front principal position | 105.18 | 113.82 | 121.92 |
| Rear principal position | 7.8 | 2.89 | −8.45 |

ZOOM LENS UNIT DATA

| Unit | Starting surface | Focal length | Lens structure length | Front principal point position | Rear principal point position |
|---|---|---|---|---|---|
| 1 | 1 | −270.1 | 66.22 | 1.21 | −60.96 |
| 2 | 5 | −38.77 | 3.5 | 2.21 | 0 |
| 3 | 7 | −62.01 | 7.94 | −0.11 | −5.32 |
| 4 | 12 | 28.82 | 10.19 | 4.12 | −2.52 |
| 5 | 17 | −46.91 | 7.65 | 2.17 | −3.41 |
| 6 | 23 | 47.74 | 16.93 | 5.12 | −7.27 |
| 7 | 29 | −4052.35 | 32.17 | −689.6 | −862.13 |

SINGLE LENS DATA

| Lens | Starting surface | Focal length |
|---|---|---|
| 1 | 1 | −166.84 |
| 2 | 3 | 524.99 |
| 3 | 5 | −38.77 |
| 4 | 7 | 910.93 |
| 5 | 8 | −27.33 |
| 6 | 10 | 52.95 |
| 7 | 12 | −44.49 |
| 8 | 13 | 32.1 |
| 9 | 15 | 37.04 |
| 10 | 18 | −50.88 |
| 11 | 20 | −37.8 |
| 12 | 21 | 40.5 |

-continued

| 13 | 23 | 35.33 |
|----|----|-------|
| 14 | 25 | 309.06 |
| 15 | 26 | −21.53 |
| 16 | 27 | 29.31 |
| 17 | 29 | 47.54 |
| 18 | 31 | −21.24 |
| 19 | 33 | 57.83 |
| 20 | 35 | −35.39 |
| 21 | 36 | 35.25 |

Numerical Example 3

UNIT mm
Surface data

| Surface number | r | d | nd | vd | Effective Diameter |
|---|---|---|---|---|---|
| 1 | 80 | 20 | 1.49171 | 57.4 | 142.9 |
| 2 | 60 | 41.07 | 1 | 0 | 98.2 |
| 3 | 213.533 | 5.15 | 1.741 | 52.6 | 77 |
| 4 | 384.878 | (variable) | 1 | 0 | 77 |
| 5* | 12826.238 | 3.5 | 1.58373 | 59.4 | 52.11 |
| 6 | 22.591 | (variable) | 1 | 0 | 36.08 |
| 7* | −210.437 | 0.1 | 1.52421 | 51.4 | 31.9 |
| 8 | −146.091 | 1.3 | 1.7725 | 49.6 | 31.83 |
| 9 | 24.773 | 2.09 | 1 | 0 | 27.93 |
| 10 | 28.493 | 4.45 | 1.84666 | 23.9 | 27.83 |
| 11 | 72.575 | (variable) | 1 | 0 | 26.74 |
| 12 | 45.228 | 1.2 | 1.72825 | 28.5 | 18.5 |
| 13 | 18.666 | 5.35 | 1.51633 | 64.1 | 18.73 |
| 14 | −133.407 | 0.15 | 1 | 0 | 19.39 |
| 15 | 34.369 | 3.49 | 1.6779 | 55.3 | 20.06 |
| 16 | −89.333 | (variable) | 1 | 0 | 19.99 |
| 17(diaphragm) | ∞ | 1.87 | 1 | 0 | 16.69 |
| 18 | −66.891 | 1.25 | 1.71999 | 50.2 | 16.35 |
| 19 | 81.615 | 0.93 | 1 | 0 | 16.44 |
| 20 | −88.722 | 1 | 1.6223 | 53.2 | 16.53 |
| 21 | 32.152 | 2.6 | 1.80518 | 25.4 | 17.77 |
| 22 | 2189.196 | (variable) | 1 | 0 | 18.28 |
| 23 | 29.94 | 6.72 | 1.43875 | 94.9 | 21.51 |
| 24 | −29.94 | 0.15 | 1 | 0 | 22.16 |
| 25* | −622.972 | 0.15 | 1.52421 | 51.4 | 22.19 |
| 26 | −128.586 | 1.2 | 1.834 | 37.2 | 22.21 |
| 27 | 20.96 | 8.71 | 1.48749 | 70.2 | 22.86 |
| 28 | −38.77 | (variable) | 1 | 0 | 24.58 |
| 29 | −276.951 | 3.53 | 1.91082 | 35.3 | 25 |
| 30 | −36.98 | 3.42 | 1 | 0 | 25 |
| 31 | −24.871 | 2 | 1.90525 | 35 | 27 |
| 32 | 61.562 | 0.16 | 1 | 0 | 27 |
| 33 | 42.065 | 5 | 1.7783 | 23.9 | 28 |
| 34 | −139.972 | 2.68 | 1 | 0 | 28 |
| 35 | −67.438 | 2 | 1.79952 | 42.2 | 35 |
| 36 | 36.511 | 13.72 | 1.497 | 81.5 | 35 |
| 37 | −24.536 | (variable) | 1 | 0 | 35 |
| Image plane | ∞ | | | | |

ASPHERIC DATA

5th surface

K 0.000E+00   A4 1.358E−05   A6 −1.792E−08   A8 2.412E−11   A10 −2.010E−14   A12 7.860E−18

7th surface

K 0.000E+00   A4 −9.211E−06   A6 2.504E−08   A8 −1.838E−11   A10 −6.640E−15

25th surface

K 0.000E+00   A4 −2.200E−05   A6 −2.588E−08   A8 −1.363E−11   A10 2.925E−13

VARIOUS DATA
Zoom ratio 2.31

| | Wide-angle | Middle | Telephoto |
|---|---|---|---|
| Focal length | 15.89 | 21.72 | 36.76 |
| F-NUMBER | 4.09 | 4.08 | 5.19 |

-continued

|  | | | |
|---|---|---|---|
| Half angle of view | 53.7 | 44.88 | 30.48 |
| Image height | 21.64 | 21.64 | 21.64 |
| Overall lens length | 224.75 | 224.75 | 224.75 |
| BF | 23.05 | 23.05 | 23.05 |
| d4 | 0.86 | 5.56 | 0.86 |
| d6 | 13.63 | 13.63 | 13.63 |
| d11 | 26.47 | 15.78 | 5.74 |
| d16 | 1.24 | 5.36 | 12.63 |
| d22 | 11.88 | 7.76 | 0.49 |
| d28 | 2.67 | 8.65 | 23.41 |
| d37 | 23.05 | 23.05 | 23.05 |
| Entrance pupil position | 85.51 | 88.76 | 85.96 |
| Exit pupil position | −122.88 | −110.47 | −109.29 |
| Front principal position | 104.41 | 113.09 | 122.01 |
| Rear principal position | 8.23 | 3.61 | −6.96 |

ZOOM LENS UNIT DATA

| Unit | Starting surface | Focal length | Lens structure length | Front principal point position | Rear principal point position |
|---|---|---|---|---|---|
| 1 | 1 | −242.73 | 66.22 | 7.73 | −54.56 |
| 2 | 5 | −38.77 | 3.5 | 2.21 | 0 |
| 3 | 7 | −62.01 | 7.94 | −0.11 | −5.32 |
| 4 | 12 | 28.82 | 10.19 | 4.12 | −2.52 |
| 5 | 17 | −46.91 | 7.65 | 2.17 | −3.41 |
| 6 | 23 | 47.74 | 16.93 | 5.12 | −7.27 |
| 7 | 29 | 82.18 | 32.52 | 159.31 | 167.49 |

SINGLE LENS DATA

| Lens | Starting surface | Focal length |
|---|---|---|
| 1 | 1 | −166.84 |
| 2 | 3 | 639.12 |
| 3 | 5 | −38.77 |
| 4 | 7 | 910.93 |
| 5 | 8 | −27.33 |
| 6 | 10 | 52.95 |
| 7 | 12 | −44.49 |
| 8 | 13 | 32.1 |
| 9 | 15 | 37.04 |
| 10 | 18 | −50.88 |
| 11 | 20 | −37.8 |
| 12 | 21 | 40.5 |
| 13 | 23 | 35.33 |
| 14 | 25 | 309.06 |
| 15 | 26 | −21.53 |
| 16 | 27 | 29.31 |
| 17 | 29 | 46.53 |
| 18 | 31 | −19.36 |
| 19 | 33 | 42.06 |
| 20 | 35 | −29.38 |
| 21 | 36 | 31.91 |

TABLE 1

| Conditional Expression | Numerical Example 1 | Numerical Example 2 | Numerical Example 3 |
|---|---|---|---|
| (1) | 0.36 | 0.32 | 0.26 |
| (2) | 14.54 | 15.44 | 13.87 |
| (3) | 288.14 | 231.58 | 44.70 |
| (5) | 1.29 | 1.46 | 1.46 |
| (6) | 0.40 | 0.40 | 0.40 |
| (7) | 0.80 | 0.94 | 0.91 |

Image Pickup Apparatus

Figure 7:
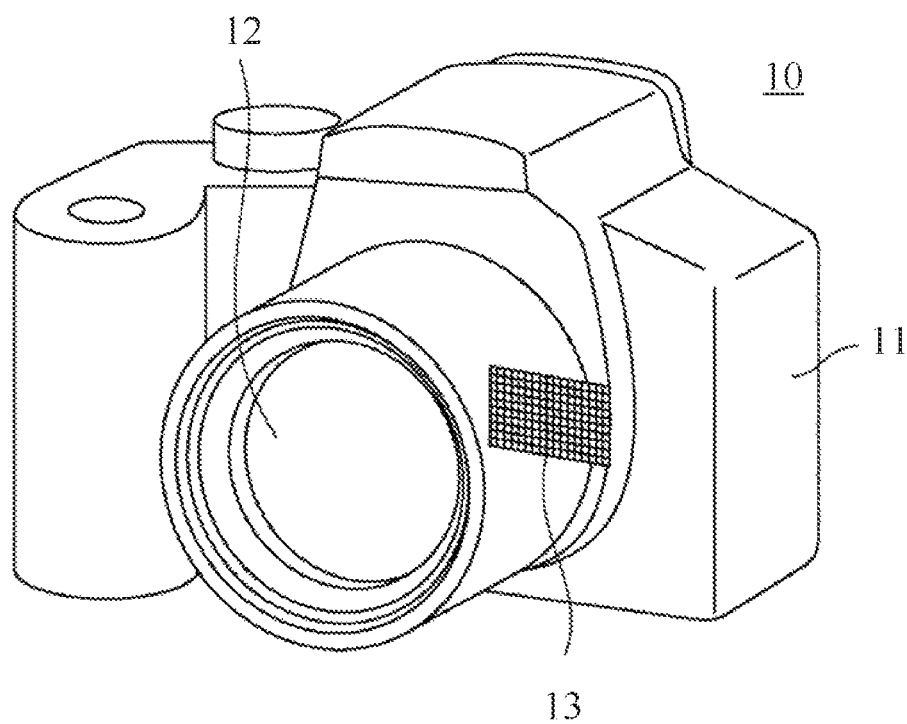
FIG. 7 is a schematic view of an image pickup apparatus according to each example.

Referring now to FIG. 7, a description will be given of a digital still camera (image pickup apparatus) 10 using the optical system L0 according to each example serving as an imaging optical system. FIG. 7 is a schematic view of the image pickup apparatus 10, and reference numeral 11 denotes a camera body, and reference numeral 12 denotes an imaging optical system including the optical system L0 according to any one of Examples 1 to 3. Reference numeral 13 denotes an image sensor (photoelectric conversion element) such as a CCD sensor and a CMOS sensor, which is built in the camera body 11, receives an optical image formed by the imaging optical system 12, and performs a photoelectric conversion. The camera body 11 may be a so-called single-lens reflex camera having a quick turn mirror, or a so-called mirrorless camera having no quick turn mirror. In this way, by applying the optical system L0 according to each example to the image pickup apparatus 10 such as a digital still camera, and by making it usable with a waterproof housing, a high optical performance can be achieved even in the water.

Each example can provide an attachment optical system, an optical system, and a method for manufacturing the optical system, each of which can provide an optical performance for underwater use which is almost as good as that for atmospheric use with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-035790, filed on Mar. 3, 2020, which is hereby incorporated by reference herein in its entirety.

What is claimed is:

1. An attachment optical system comprising:
   a first converter optical system attachable to an object side of an imaging optical system; and
   a second converter optical system attachable to an image side of the imaging optical system,
   wherein the first converter optical system includes a dome-shaped cover and at least one positive lens, and
   wherein the following conditional expression is satisfied:

$$0.00 < |fd/ffc| < 0.50$$

where fd is a focal length of the dome-shaped cover in water, and ffc is a focal length of the at least one positive lens.

2. The attachment optical system according to claim 1, wherein the following conditional expressions are satisfied:

$$5 < |ffm/fwm| < 50$$

$$5 < |frm/fwm| < 500$$

where ffm is a focal length of the first converter optical system in the water, fwm is a focal length of the imaging optical system in air, and frm is a focal length of the second converter optical system.

3. The attachment optical system according to claim 1, wherein the second converter optical system includes at least one positive lens and at least one negative lens, and
   wherein the following conditional expression is satisfied:

$$Ndp < Ndn$$

where Ndn is an average refractive index of the at least one negative lens in the second converter optical system, and Ndp is an average refractive index of the at least one positive lens in the second converter optical system.

4. The attachment optical system according to claim 1, wherein the following conditional expression is satisfied:

$$1.00 < Skcw/Skmw < 1.80$$

where Skcw is a distance from a lens closest to an image plane in the imaging optical system to which the attachment optical system is attached, to the image plane, and Skmw is a backfocus of the imaging optical system to which the attachment optical system is not attached.

5. The attachment optical system according to claim 1, wherein the imaging optical system does not change before and after the attachment optical system is attached to the imaging optical system.

6. An optical system comprising:
   an imaging optical system; and
   an attachment optical system,
   wherein the attachment optical system includes:
   a first converter optical system attachable to an object side of an imaging optical system; and
   a second converter optical system attachable to an image side of the imaging optical system,
   wherein the first converter optical system includes a dome-shaped cover and at least one positive lens, and
   wherein the following conditional expression is satisfied:

$$0.00 < |fd/ffc| < 0.50$$

where fd is a focal length of the dome-shaped cover in water, and ffc is a focal length of the at least one positive lens.

7. The optical system according to claim 6, wherein the following conditional expressions are satisfied:

$$5 < |ffm/fwm| < 50$$

$$5 < |frm/fwm| < 500$$

where ffm is a focal length of the first converter optical system in the water, fwm is a focal length of the imaging optical system in air, and frm is a focal length of the second converter optical system.

8. The optical system according to claim 6, wherein the following conditional expression is satisfied:

$$1.00 < Skcw/Skmw < 1.80$$

where Skcw is a distance from a lens closest to an image plane in the imaging optical system to which the attachment optical system is attached, to the image plane, and Skmw is a backfocus of the imaging optical system to which the attachment optical system is not attached.

9. The optical system according to claim 6, wherein the following conditional expression is satisfied:

$$0.25 \leq Skmw/tdmw < 1.20$$

where Skmw is a backfocus of the imaging optical system to which the attachment optical system is not attached, and tdmw is a distance from a lens closest to an object to a lens closest to an image plane in the imaging optical system.

10. The optical system according to claim 6, wherein the following conditional expression is satisfied:

$$0.70 < fwc/fwm < 1.00$$

where fwc is a focal length of the optical system in the water, and fwm is a focal length of the imaging optical system in air.

11. A manufacturing method of an optical system comprising the steps of:
    attaching at least one positive lens in a first converter optical system to an object side of an imaging optical system;
    attaching a second converter optical system to an image side of the imaging optical system; and
    attaching a dome-shaped cover in the first converter optical system to the object side of the imaging optical system,
    wherein the following conditional expression is satisfied:

$$0.0 < |fd/ffc| < 0.5$$

where fd is a focal length of the dome-shaped cover in water, and ffc is a focal length of the at least one positive lens.

* * * * *